United States Patent Office 2,974,271
Patented Mar. 7, 1961

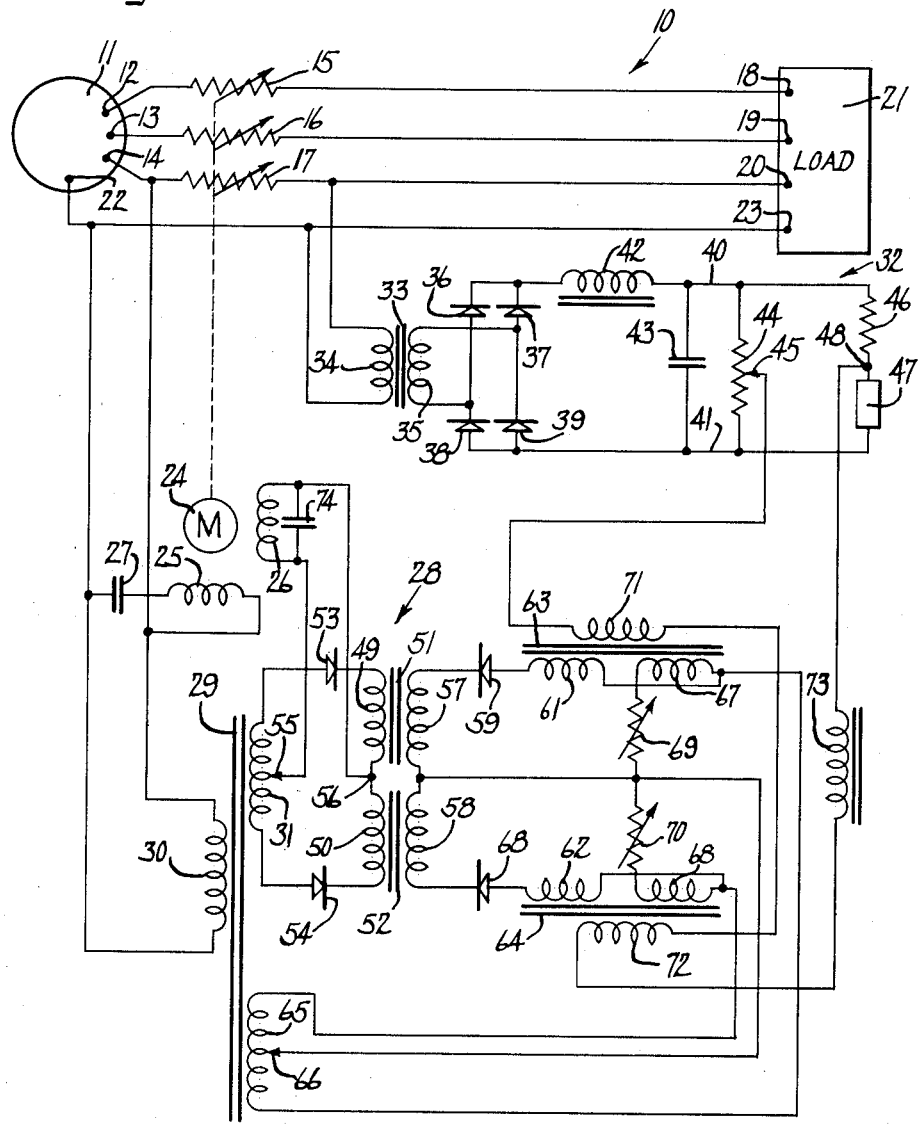

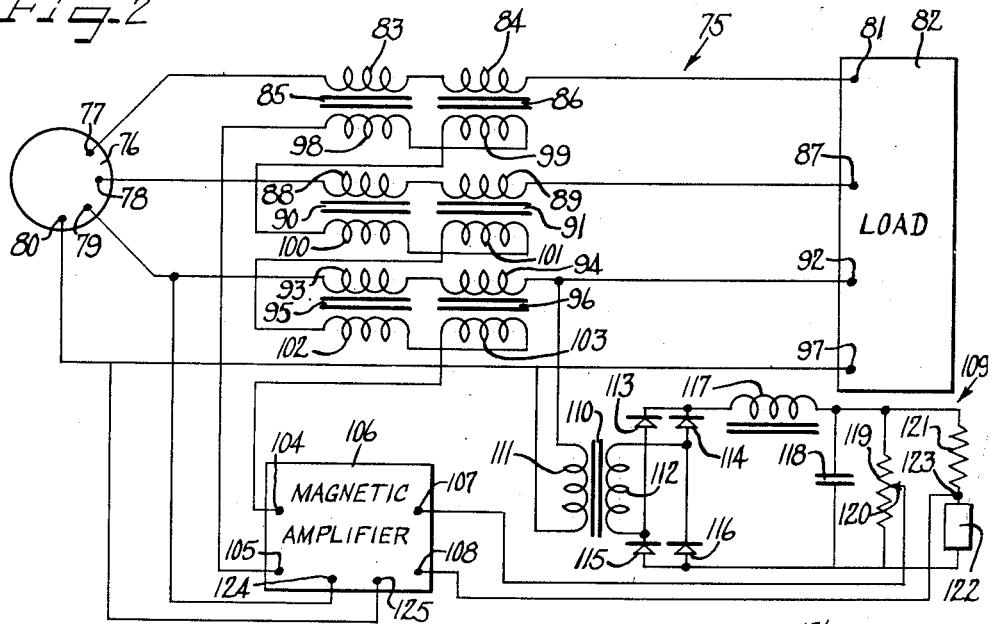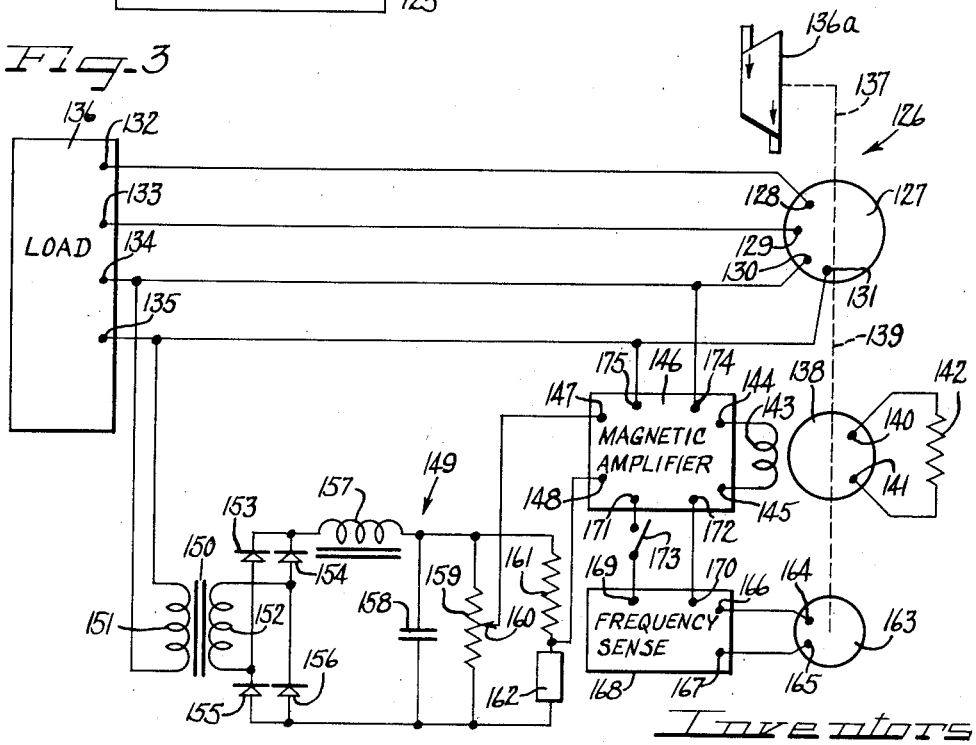

2,974,271

VOLTAGE REGULATOR

Fred H. Guth, Warrensville Heights, and John V. Majercak, Cleveland, Ohio, assignors to Thompson Ramo Wooldridge Inc., a corporation of Ohio Filed July 8, 1957, Ser. No. 670,417

3 Claims. (Cl. 323—66)

This invention relates to an alternator system which is particularly designed for supplying electrical power in aircraft. In such a system, sudden changes in the load on the alternator and in the amount of power available to drive the alternator make it difficult to maintain stable operation, and it is an object of this invention to provide a system for accurately and reliably stabilizing the supply of power from an alternator to a load.

Another object of this invention is to provide a stabilizing system which is rugged in construction and trouble-free in operation.

According to this invention, the supply of power from the alternator to the load is controlled in response to deviations in the load voltage from a predetermined value, to maintain the load voltage substantially constant. It is found that with this system, it is possible to maintain highly stable operation despite sudden and large variations in the load and in the amount of power available to drive the alternator.

Important features of the invention reside in the construction of the means used to control supply of power to the load. In one embodiment, such means comprises a coupling circuit between the alternator and the load which includes impedance means in the form of variable resistances and a two-phase motor for controlling the values of the resistances. In another embodiment, the impedance means are in the form of saturable reactances. In still another embodiment, a parasitic alternator is mechanically coupled to the main alternator to be driven from the same motive power source and the supply of power to the main alternator is controlled by controlling the supply of power from the parasitic alternator to a parasitic load.

Another important feature of the invention is in a circuit arrangement for obtaining a highly accurate and reliable indication of the deviation of the load voltage from a predetermined value.

Another feature is in a circuit for amplifying the output of the voltage sensing means to apply an amplified signal to the means used to regulate supply of power to the load.

The output of the voltage sensing means may be used as the sole control of the power-regulating means, and in general such an arrangement is highly satisfactory even though there may be variations in the speed of rotation of the alternator and hence variations in the frequency output. However, in some circumstances it may be desirable to maintain the frequency at a value within a narrow range, and a further feature of the invention is in the use of frequency-sensing means in combination with the voltage-sensing means to control operation.

It will be apparent that the features of this invention have general application to all types of alternator systems, even though the systems illustrated are specifically designed for aircraft use.

This invention contemplates other and more specific objects, features and advantages which will become more fully apparent from the following detailed description taken in conjunction with the accompanying drawings which illustrate preferred embodiment and in which:

Figure 1 is a circuit diagram of one preferred form of electrical supply system constructed according to the principles of this invention;

Figure 2 is a circuit diagram of another preferred form of electrical supply system constructed according to the principles of this invention; and Figure 3 is a circuit diagram of still another preferred type of electrical supply system constructed according to the principles of this invention.

In Figure 1, reference numeral 10 generally designates one form of electrical supply system constructed according to this invention. The system 10 comprises a three-phase alternator 11 which may be driven by any suitable motive power source such as the turbine for example. The alternator 11 has output terminals 12, 13 and 14 which are respectively connected through variable resistors 15, 16 and 17 to terminals 18, 19 and 20 of a load circuit indicated diagrammatically by the box 21. A Delta connection may be used, but a Y connection is illustrated with a neutral terminal 22 of the alternator being connected to a neutral terminal 23 of the load.

To control the supply of power to the load, the resistors are adjusted and for this purpose, the adjustable elements thereof are mechanically ganged together and connected to a two-phase motor 24 having windings 25 and 26. The winding 25 is connected in series with a phase-shifting capacitor 27 to output terminals of the alternator 11 such as the terminal 14 and the neutral terminal 22 as illustrated. The effect of the capacitor 27 is to apply to the winding 25 a current which is substantially 90° out of phase with the voltage between terminals 14 and 22.

To effect rotation of the motor 24, a current is applied to the winding 26 which is either in phase or 180° out of phase with the voltage developed between terminals 14 and 22. For this purpose, the winding 26 is connected to a magnetic amplifier generally designated by reference numeral 28 which includes a power supply transformer 29 having a primary winding 30 connected to the terminals 14 and 22 and a secondary winding 31 connected in circuit with the motor winding 26. The magnetic amplifier 28 has an input circuit connected to the output circuit of a voltage-sensing circuit generally designated by reference numeral 32 which has an input connected to the terminals 20, 23 of the load 21.

In the general operation of the circuit, the voltage-sensing circuit 32 develops an error signal proportional to the deviation of the load voltage from a predetermined voltage. This error signal is amplified by the amplifier 28 and converted to an alternating current signal which is applied to the winding 26 of the motor 24. If, for example, the load voltage should increase above the predetermined value, the motor 24 will be energized in a direction to cause the values of the resistances 15—17 to increase to thus reduce the load voltage. The operation will, of course, be the opposite with a load voltage less than the preset value.

The voltage-sensing circuit 32 is an important feature of the invention. In particular, it comprises a transformer 33 having a primary winding 34 connected to the load terminals 20—23 and a secondary winding 35 which is connected to the full wave bridge rectifier including diodes 36, 37, 38 and 39, the output of the rectifier being connected to conductors 40 and 41 through a filter circuit including a series inductance 42 and a parallel capacitor 43. There is thus developed between the conductors 40 and 41 a rectified and filtered voltage which is proportional to the voltage between load terminals 20 and 23.

The conductors 40 and 41 are connected to a bridge circuit one arm of which is in the form of a potentiometer 44 having a movable contact 45 and the other arm of which is in the form of a resistor 46 in series with a reference element 47. The properties of the reference element 47 are such relative to the resistance of the resistor 46 and the normal voltage between the conductors 40 and 41 that the voltage developed across the reference element 47 is very nearly constant despite variations in the voltage between the conductors 40 and 41. The output signal is leveleded between the potentiometer contact 45 and a circuit point 48 at the junction between resistor 46 and the reference element 47. Thus the output voltage is proportional to the difference between the voltage from conductor 41 to the contact 45 and the voltage across the reference element 47.

It will be appreciated that the voltage from conductor 41 to the contact 45 varies in proportion to variations of the voltage between conductors 40 and 41 and since the voltage across the reference element 47 is substantially constant, the output voltage will be proportional to the deviation of the sensing voltage from the balance voltage of the bridge. The balance point may be varied by adjustment of the contact 45.

The reference element 47 is preferably a silicon diode which it is found is very stable in operation and has a very low temperature coefficient. With this type of element, a temperature coefficient of plus or minus 0.001% per degree centigrade is readily obtained so that for a 100° centigrade temperature change the reference voltage will change only 0.1% or an equivalent system voltage of 0.115 volt with a 115 volt supply. It is possible by more rigorous selection to obtain even better performance.

The magnetic amplifier 28 comprises an output stage which includes winding 49 and 50 of saturable reactors 51 and 52, the windings 49 and 50 being connected in series with rectifiers 53 and 54 to the end terminals of the secondary winding 31, the output being taken between a center tap 55 of the winding 31 and a circuit point 56 at the junction between windings 49 and 50. The winding 26 is thus connected between the center tap 55 and the circuit point 56.

The amplifier is so designed that the output at no signal is a full wave output firing at 90° for each half cycle. This output does not contain any fundamental component so that the motor 24 will remain stationary if a signal is applied, the output changes in such a way as to increase during one-half cycle and decrease in the other. This causes a change in the fundamental component. Thus the magnetic amplifier provides a variable magnitude, phase reversing signal for driving the motor 24.

The saturable reactors 51 and 52 have control windings 57 and 58 which are respectively connected through rectifiers 59 and 60 and through windings 61 and 62 of saturable reactors 63 and 64 to the end terminals of a secondary winding 65 of the transformer 29, the secondary winding 65 having a center tap connected to the junction between windings 57 and 58. The reactors 63 and 64 have reference windings 67 and 68 which are respectively connected in series with variable resistors 69 and 70 between the end terminals of the secondary winding 65 and the center tap 66. Control windings 71 and 72 of the reactors 63 and 64 are connected in series with an inductance 73 to the output of the voltage-sensing circuit 32 developed between the circuit point 48 and the potentiometer contact 45.

The first stage of the magnetic amplifier 28 is thus a biased magnetic amplifier which is coupled to the second stage in the gating mode. The firing angle of the first stage controls the firing angle of the second stage. Each half of the first stage is biased to fire at the 90° point and the control windings of the first stage are so arranged that a signal of one polarity causes one firing angle to increase and the other to decrease while the reverse takes place if the signal is reversed. The inductance 73 reduces circulating current which result from the voltages induced in the windings 71, 72.

It should be noted that although the fundamental component of the output varies with variations in the input signal, the average or direct current component of the output voltage remains substantially constant. This direct current component provides a constant damping factor on the motor 24 which aids stability.

It should further be noted that a capacitor 74 is connected in parallel with the control winding 26 of the motor 24 to resonance at the fundamental frequency.

Referring now to Figure 2, reference numeral 75 generally designates another preferred form of electrical supply system constructed according to the principles of this invention. The system 75 comprises an alternator 76 arranged to be driven by any suitable motive power source such as a turbine and having output terminals 77, 78, 79 and 80, the alternator being a three-phase type with the terminal 80 being a neutral terminal.

The terminal 77 is connected to a terminal 81 of a load 82 through windings 83 and 84 of saturable reactors 85 and 86; the terminal 78 is connected to a terminal 87 of the load through windings 88 and 89 of saturable reactors 90 and 91; the terminal 79 is connected to a terminal 92 of the load through windings 93 and 94 of saturable reactors 95 and 96; and the neutral terminal 80 is connected directly to a neutral terminal 97 of the load.

The saturable reactors 85, 86, 90, 91, 95 and 96 are respectively provided with control windings 98, 99, 100, 101, 102 and 103 which are connected in series and in properly phased relation to output terminals 104 and 105 of a magnetic amplifier 106 having input terminals 107 and 108 connected to the output of a voltage-sensing circuit 109 which is connected to the load terminals 92 and 97.

In the general operation of this circuit, the voltage-sensing circuit develops an error signal proportional to the deviation of the load voltage from a preset value. This error signal is applied to the magnetic amplifier 106 which applies to the saturable reactors, a biasing signal which varies in polarity and magnitude in proportion to the error signal, to increase or decrease the effective reactance which is presented by the windings of the saturable reactors. The system is so connected that if the load voltage should increase to a value above the preset value, the effective reactances of the saturable reactors will be increased to thus reduce the load voltage. The operation is, of course, reversed with a load voltage less than the preset value.

The voltage-sensing circuit 109 preferably is the same as the sensing circuit 32 described above in connection with Figure 1 and in particular, the sensing circuit 109 comprises a transformer 110 having a primary 111 connected to the terminals 92 and 97 and a secondary 112 which is connected to a bridge rectifier consisting of rectifiers 113, 114, 115 and 116, the output of the rectifier being applied through a filter circuit including a series inductance 117 and a parallel capacitor 118 to a bridge circuit which comprises a potentiometer 119 having a movable contact 120 and a resistor 121 connected in series with a reference element 122, preferably a silicon diode. The output voltage is taken between the contact 120 and a circuit point 123 at the junction between resistor 121 and the reference element 122. The operation of this circuit is, of course, the same as that described above in connection with Figure 1.

It may be noted that in the circuits of both Figure 1 and Figure 2, the adjustable impedances are connected in series between the alternator and the load. In many cases it is possible with proper design to use an adjustable impedance in parallel.

It should further be noted that the construction of the magnetic amplifier 106 is not illustrated in detail because any conventional form of direct current amplifier may be used. Power to the magnetic amplifier 106 may be supplied from the alternator 76 and for this purpose, the terminals 79 and 80 of the alternator are connected to terminals 124 and 125 of the magnetic amplifier.

Referring now to Figure 3 reference numeral 126 generally designates another preferred form of electrical supply system. The system 126 comprises a three-phase alternator 127 having output terminals 128, 129, 130 and 131 which are respectively connected to terminals 132, 133, 134 and 135 of a load circuit 136, the terminals 131 and 135 being neutral terminals.

The alternator 127 is mechanically driven from a turbine 136a as diagrammatically indicated by the dotted line 137.

To control the supply of power to the load, a parasitic alternator 138 is mechanically coupled to the alternator 127 as diagrammatically indicated by dotted line 139 so as to be driven from a common motive power source. To decrease the output of the main alternator 127, the power taken by the parasitic alternator 138 is increased and conversely to increase the output of the main alternator 127, the load taken by the parasitic alternator 138 is decreased. It will be understood that the turbine 136 or other motive power source that may be used must have a drooping speed-load characteristic such that the speed is decreased as the load is increased.

The parasitic alternator 138 has output terminals 140 and 141 connected to a load 142 and to vary the load taken by the parasitic alternator 138, the voltage applied to a control field winding 143 is varied. The winding 143 is connected to output terminals 144 and 145 of a magnetic amplifier 146 which has input terminals 147 and 148 connected to the output of a voltage-sensing circuit 149 having an input connected to the terminals 134, 135 of the load circuit 136.

In the general operation of this circuit, the voltage-sensing circuit develops an error signal proportional to the deviation of the output voltage from a preset value, this signal being amplified by the amplifier 146 and applied to the control winding 143 to vary the excitation of the parasitic alternator 138 and thus vary the mechanical load on the turbine 136. If, for example, the load voltage should increase, the excitation of the parasitic alternator 138 is increased to increase the load on the turbine 136 and decrease the speed of operation of the main alternator 127 and thus decrease the output voltage.

The voltage-sensing circuit 149 is preferably the same as the circuit 32 of the system of Figure 1. In particular, it comprises a transformer 150 having a primary winding 151 connected ot the terminals 134 and 135 of the load 136 and having a secondary winding 152 connected to a full wave bridge rectifier consisting of diodes 153, 154, 155 and 156 which is connected through a filter circuit including a series inductance 157 and a shunt capacitor 158 to a bridge circuit comprising a potentiometer 159 having a movable contact 160 and a resistor 161 connected in series with a reference element 162, preferably a silicon diode. The output voltage is developed between the junction of resistor 161 and 162 which is connected to terminal 148 and the contact 160 which is connected to the terminal 147.

The output of the voltage-sensing means may be used as the sole control of the power-regulating means and in general such an arrangement is highly satisfactory even though there may be variations in the speed of rotation of the alternator and hence variations in the frequency output. Howeevr, in some circumstances it may be desirable to maintain the frequency at a value within a narrow range and according to a further feature of the invention, means are provided for applying a frequency-sensing signal to the magnetic amplifier 146. In particular, a small generator 163 is mechanically coupled to the alternators and turbine and has output terminals 164 and 165 connected to input terminals 166 and 167 of a frequency-sensing circuit 168. This circuit is arranged to develop an output signal which is proportional to the deviation of frequency from a preset value.

The frequency-sense circuit 168 has output terminals 169 and 170 which are connected to input terminals 171 and 172 of the magnetic amplifier 146. A switch 173 is preferably provided between the terminals 169 and 171.

When the switch 173 is closed, the alternator operation will be controlled both in response to voltage output and frequency. The relative effects of variations in output voltage and frequency may preferably be effected by adjustment of suitable elements in the magnetic amplifier input circuit. It will be appreciated that this system thus gives to a considerable extent the advantages of the use of voltage-sensing means and at the same time, the frequency can be maintained within the desired limits.

The circuits of the magnetic amplifier 146 and the frequency-sensing circuit 168 may be conventional and they are therefore not illustrated in detail. Power to the magnetic amplifier 146 may be supplied by connecting terminals 174 and 175 thereof to terminals 130 and 131 of the alternator 127.

It will be understood that modifications and variations may be effected without departing from the spirit and scope of the novel concepts of this invention.

We claim as our invention:

1. In an electrical supply system including an alternator arranged to be coupled to a load, mechanically operated means for controlling the voltage applied to the load, a two-phase induction motor mechanically coupled to said mechanically operated means and having a pair of windings, sensing means arranged to produce a D.C. error signal having a polarity and magnitude determined by the direction and deviation of the load voltage from a certain value, a magnetic amplifier having an A.C. power input circuit and a D.C. control input circuit and arranged to produce an A.C. output voltage either in phase or out of phase with the A.C. power input circuit voltage dependent upon the voltage in said D.C. control input circuit, means coupling said D.C. error signal to said D.C. control input circuit, means coupling two A.C. voltages derived from said alternator to said A.C. power input circuit and one of said motor windings including phase shifter means for shifting the phase of one of said two A.C. voltages 90° relative to the other, and means coupling said A.C. output voltage of said magnetic amplifier to the other motor winding.

2. In an electrical supply system including an alternator arranged to be coupled to a load, mechanically operated means for controlling the voltage applied to the load, a two phase induction motor mechanically coupled to said mechanically operated means and having a pair of windings, sensing means arranged to produce a D.C. error signal having a polarity and magnitude determined by the direction and deviation of the load voltage from a certain value, a first transformer winding having a center cap connected to one terminal of one of said motor windings, a pair of rectified devices having terminals connected to end terminals of said transformer winding, a pair of saturable reactors having windings connected between the other terminal of said one of said motor windings and the other terminals of said rectifier devices, means controlled by said error signals for controlling the relative degree of saturation of said saturable reactors, and means coupling two A.C. voltages from said alternator to said transformer winding and the other motor winding including means for shifting the phase of one A.C. voltage 90° relative to the other.

3. In an electrical supply system including an alternator arranged to be coupled to a load, mechanically operated means for controlling the voltage applied to the load, a two phase induction motor mechanically coupled to said mechanically operated means and having a pair of windings, sensing means arranged to produce a D.C. error signal having a polarity and magnitude determined by the direction and deviation of the load voltage from a certain value, a first transformer winding having a center cap connected to one terminal of one of said motor windings, a pair of rectifier devices having terminals connected to end terminals of said transformer winding, a first pair of saturable reactors having a first pair of windings connected between the other terminal of said one of said motor windings and the other terminals of said rectifier devices, a second pair of windings on said first pair of saturable reactors, a second transformer winding having a center cap connected to one terminal of each of said second pair of windings, means including windings of a second pair of saturable reactors and a pair of rectified devices connecting the other terminals of said second pair of windings to the end terminals of said second transformer winding, means controlled by said error signal for controlling the relative degree of saturation of said second pair of saturable reactors, and means applying to A.C. voltages from said alternator to said motor winding and to said transformer windings including means for shifting the phase of one A.C. voltage 90° relative to the other.

References Cited in the file of this patent
UNITED STATES PATENTS

| | | |
|---|---|---|
| 2,078,880 | Logan | Apr. 27, 1937 |
| 2,562,744 | Schultz | July 31, 1951 |
| 2,638,571 | Schultz | May 12, 1953 |
| 2,641,738 | Sikorra | June 9, 1953 |
| 2,714,188 | Scherer | July 26, 1955 |
| 2,780,769 | McHenry | Feb. 5, 1957 |
| 2,793,338 | Rhyne | May 21, 1957 |
| 2,809,341 | Silver | Oct. 8, 1957 |
| 2,814,773 | Comins et al. | Nov. 26, 1957 |

OTHER REFERENCES

"Electronic Engineering Principles," by J. D. Ryder, Prentice-Hall, Inc., 1952.